United States Patent
Sowul et al.

(10) Patent No.: US 7,347,797 B2
(45) Date of Patent: Mar. 25, 2008

(54) ELECTRO-MECHANICAL TRANSMISSION WITH SIX SPEED RATIOS AND A METHOD OF REDESIGNING A TRANSMISSION

(75) Inventors: Henryk Sowul, Oxford, MI (US); James D. Hendrickson, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 179 days.

(21) Appl. No.: 11/285,682

(22) Filed: Nov. 21, 2005

(65) Prior Publication Data

US 2007/0117668 A1    May 24, 2007

(51) Int. Cl.
    *F16H 3/72* (2006.01)
(52) U.S. Cl. .......................................... 475/5; 475/149
(58) Field of Classification Search ................ 475/5, 475/149; 903/909, 910, 911, 917
    See application file for complete search history.

(56) References Cited

U.S. PATENT DOCUMENTS 7,201,690 B2 *    4/2007   Miura et al. ................... 475/2

2005/0107198 A1    5/2005   Sowul et al.
2006/0061322 A1 *  3/2006   Yamazaki et al. .......... 320/104

* cited by examiner

*Primary Examiner*—Sherry Estremsky
*Assistant Examiner*—Edwin A Young

(57) ABSTRACT

An electro-mechanical transmission is provided having an input member for receiving power from an engine and output member. A plurality of gear members is operable for changing speed ratio between the input member and the output member. The input is connected with one of the gear members and the output member is connected with another of the gear members. A motor/generator is continuously operatively connected with the output member (via a planetary gear set) in parallel with the gear member that is continuously connected with the output member. The motor/generator is packaged axially between the input member and the plurality of gear members. The motor/generator is packaged in a packaging space typically utilized for a torque converter in a nonelectro-mechanical transmission. Thus, redesign of the nonelectro-mechanical transmission to achieve the electro-mechanical transmission involves a minimal number of steps.

17 Claims, 1 Drawing Sheet

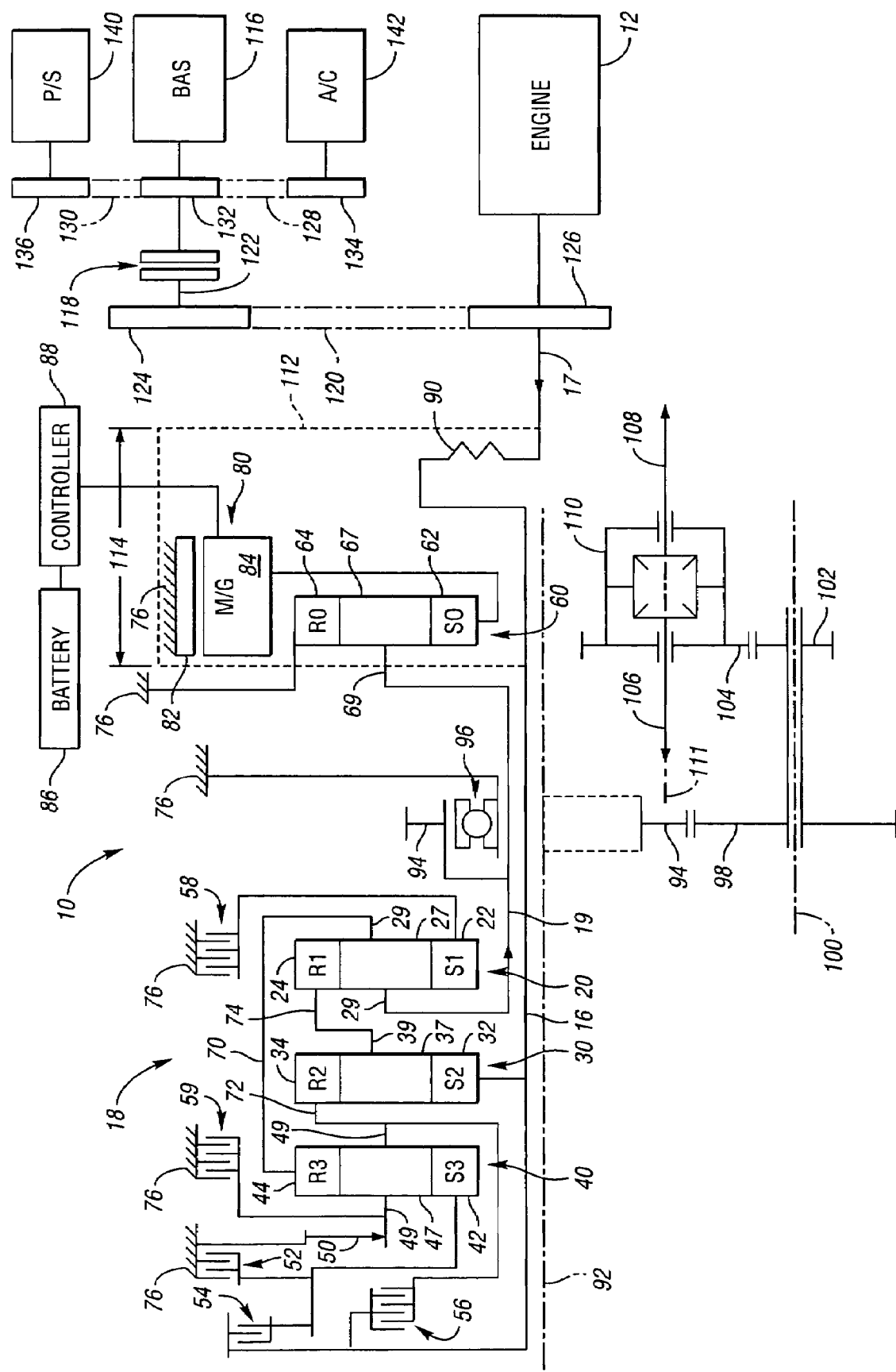

US 7,347,797 B2

ELECTRO-MECHANICAL TRANSMISSION WITH SIX SPEED RATIOS AND A METHOD OF REDESIGNING A TRANSMISSION

TECHNICAL FIELD

The invention relates to electromechanical transmissions and transmission design.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric motor/generator can transform mechanical power from the engine into electrical power, and can also transform that electric power back into mechanical power at different torques and speeds for the remainder of the vehicle drive system. This arrangement allows a continuous variation in the ratio of torque and speed between engine and the remainder of the drive system, within the limits of the electric machinery.

One form of transmission gearing is differential gearing which, as is well known to those skilled in this art, may constitute a planetary gear set. Planetary gearing is usually the preferred embodiment employed in differentially geared inventions, with the advantages of compactness and different torque and speed ratios among all members of the planetary gear set. Differential gearing may alternatively use bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

Hybrid systems may be implemented by completely redesigning the powertrain of a vehicle. A high level of hybridization may be achieved with such "full hybrid" systems that contain multiple hybrid functions such as engine stop-start, regenerative braking, electric motor assist, electric launch. Such custom hybrid systems typically have limited application to existing powertrains because significant vehicle modification would be required due to packaging limitations.

SUMMARY OF THE INVENTION

An electromechanical transmission is provided that may be implemented with minimal design changes in an existing powertrain. Thus, hybrid functionality and its inherent benefits may be achieved with minimal design changes and their associated costs. Specifically, hybrid system components are placed within a base transmission envelope by eliminating a torque converter. The axial space previously occupied by the torque converter is utilized to install an electric motor/generator, an additional planetary gear set for electric motor torque multiplication, and, optionally, a damper. Preferably, the output torque path remains unchanged. The motor/generator is connected to the output torque path and is unaffected by gear shifting pattern, thus allowing optimal regenerative braking to occur.

The electromechanical transmission has an input member for receiving power from an engine and an output member. A plurality of gear members operable for changing speed ratio between the input member and the output member is provided. The input member is connected with one of the gear members and the output member is connected with another of the gear members. A motor/generator (which may also be referred to herein as an electric machine) is operatively connected (i.e., continuously connected) with the output member in parallel with another of the plurality of gear members via an additional planetary gear set described below. The motor/generator is packaged axially between the input member and the plurality of gear members. The motor/generator is continuously connected with the output member so that torque to the motor/generator from the output member during braking and/or coasting is transferred smoothly with an absence of selectively engagable connections. Thus, regardless of the speed ratio established by engaged torque-transmitting mechanisms, regenerative braking is not affected by transmission shifting.

The plurality of gear members may include first, second and third planetary gear sets. A plurality of torque-transmitting mechanisms is provided. Each torque-transmitting mechanism is selectively engagable to connect one of the gear members with another of the gear members, with the input member or with the stationary member.

In one aspect of the invention, the electromechanical transmission includes a planetary gear set having a first, a second and a third member which may be a ring gear member, a sun gear member and a carrier member, although not necessarily in that order. The planetary gear set is preferably circumscribed by the motor/generator and is referred to herein as an additional planetary gear set.

The transmission includes a main shaft and the gear member that is connected with the input member via the main shaft. The output member may be a transfer shaft coaxial with the main shaft. Preferably, the motor/generator is connected with the sun gear member, the carrier member is connected with the transfer shaft and the ring gear member is connected with a stationary member, such as the transmission housing. This arrangement provides the highest torque multiplication achievable through the planetary gear set. Preferably, the plurality of gear members (the first, second and third planetary gear sets), the motor/generator and the additional planetary gear set (that is circumscribed by the motor/generator) rotate about a common axis of rotation defined by the input member and the output member.

In yet another aspect of the invention, a damper may be connected between the input member and the plurality of gear members to absorb engine vibration.

The coaxial layout described above with the motor/generator packaged between the engine and the first, second and third planetary gear sets is conducive to operation with a supplemental motor/generator such as a starter motor/generator in order to start the engine after a hybrid stop or during an electric launch. The starter motor/generator may be referred to as a belt alternator starter (BAS). A clutch is provided that is selectively engagable to connect the starter motor/generator with the input member via a rotational transfer device, such as a chain and pulley arrangement. This allows the starter motor/generator to provide torque to the input member for starting the engine or to receive torque from the input member for powering other vehicle components, such as a power steering system or an air conditioning system.

Due to the packaging arrangement of the motor/generator between the engine and the plurality of gear members in a coaxial arrangement for common rotation about the axis of rotation of the gear members, it is possible to redesign an existing transmission with a minimal number of modification steps to achieve the electro-mechanical transmission described above. Specifically, a method of redesigning a transmission includes providing a transmission having a torque converter, an input member and an output member as well as a plurality of gear members for transferring torque from the input member to the output member. The transmission, which is a multi-speed, non-hybrid transmission, has the torque converter packaged between the input member and the plurality of gear members. The output member is positioned axially between the plurality of gear members and the torque converter. The torque converter defines an axial width. The method includes replacing the torque converter with a motor/generator that is continuously connected to the output member and is positioned in the axial width. Preferably, the additional planetary gear set and the damper described above are also added to the transmission within the axial width previously occupied by the torque converter. If the additional planetary gear set is added, one of its members is continuously connected with the motor/generator and another of its members is continuously connected with the output member and is coaxial with the motor/generator. Thus, a non-hybrid transmission is converted to a hybrid transmission with only packaging within the axial width occupied by the torque converter being affected.

The above features and advantages and other features and advantages of the present invention are readily apparent from the following detailed description of the best mode for carrying out the invention when taken in connection with the accompanying drawing.

BRIEF DESCRIPTION OF THE DRAWING

The drawing is a schematic illustration of an electromechanical transmission within the scope of the invention.

DESCRIPTION OF THE PREFERRED EMBODIMENT

The drawing depicts an electromechanical transmission 10. An engine 12 is operatively connected to the transmission 10 for providing power thereto. Specifically, the engine 12 powers an input member 17. Power flows from the input member 17 through a plurality of gear members 18 to an output member 19. The plurality of gear members 18 includes a first planetary gear set 20, a second planetary gear set 30 and a third planetary gear set 40. The first planetary gear set 20 includes a sun gear member 22 circumscribed by a ring gear member 24 (labeled S1, R1, respectively) and a carrier member 29 on which a plurality of rotatable pinion gears 27 are supported. The pinion gears 27 intermesh with both the sun gear member 22 and the ring gear member 24.

The planetary gear set 30 also includes a sun gear member 32, a ring gear member 34 and a carrier member 39 (labeled S2, R2, respectively) on which a plurality of pinion gears 37 are rotatably supported. The pinion gears 37 intermesh with both the sun gear member 32 and the ring gear member 34.

The planetary gear set 40 includes a sun gear member 42, a ring gear member 44 (labeled S3, R3, respectively) and a carrier member 49 on which a plurality of pinion gears 47 are rotatably supported. The pinion gears 47 intermesh with both the sun gear member 42 and the ring gear member 44. Although each of the planetary gear sets 20, 30, 40 are depicted as simple planetary gear sets, one or more compounded planetary gear sets, such as a Ravigneaux gear set, may be used within the scope of the invention.

The input shaft 17 is continuously connected with the sun gear member 32 via a main shaft 16. The output shaft 19 is continuously connected with the carrier member 29. An interconnecting member 70 continuously interconnects the ring gear member 44 with the carrier member 29. An interconnecting member 72 continuously interconnects the carrier member 49 with the ring gear member 34. An interconnecting member 74 continuously interconnects the carrier member 39 with the ring gear member 24.

The electromechanical transmission 10 includes a plurality of torque-transmitting mechanisms 50, 52, 54, 56, 58 and 59. The torque-transmitting mechanism 50 is a freewheeling (one-way) clutch. The clutch 50 selectively connects the carrier member 49 with a stationary member 76, i.e., the transmission housing. The torque-transmitting mechanism 52 is a stationary-type torque-transmitting mechanism, i.e., a brake that selectively connects the sun gear member 42 with the transmission housing 76. The torque-transmitting mechanism 54 is a rotating type torque-transmitting mechanism, i.e., a clutch, and selectively connects the sun gear member 42 with the main shaft 16 and therefore with the input member 17. The torque-transmitting mechanism 56 is a clutch that selectively connects the carrier member 49 (and the ring gear member 34 via interconnecting member 72) with the main shaft 16 and therefore with the input member 17. The torque-transmitting mechanism 58 is a brake and selectively connects the sun gear member 22 with the transmission housing 60. The torque-transmitting mechanism 59 is a brake and selectively connects the carrier member 49 with the transmission housing 76.

In addition to receiving power from the engine 12, the electromechanical transmission 10 is also selectively powered by a motor/generator 80 that is continuously connected with the output member 19 through an additional planetary gear set 60. The motor/generator 80 includes a stator 82 that is continuously connected with the transmission housing 76 as well as a rotor 84 that is continuously connected with a sun gear member 62 (labeled S0) of the planetary gear set 60. The planetary gear set 60 further includes a ring gear member 64 (labeled RO) and a carrier member 69 on which a plurality of pinion gears 67 are rotatably mounted. The pinion gears 67 intermesh with both the sun gear member 62 and the ring gear member 64. The ring gear member 64 is continuously grounded to the transmission housing 76. Thus, the motor/generator 80 is connected in parallel with the plurality of gear members 18 for providing power to the output member 19 or, when controlled to act as a generator, receiving power from the output member 19 through the planetary gear set 60.

As will be well understood by those skilled in the art, a controller 88, such as an electronic control unit, is operatively connected in signal communication with the motor/generator 80 for controlling electrical power flow between an energy storage device such as a battery 86 and the motor/generator 80. Thus, when the motor/generator 80 is controlled by the controller to act as a motor, electrical power flows from the battery 86 to the motor/generator 80 for providing power thereto. Alternatively, if the motor/generator 80 is controlled by the controller 88 to act as a generator, the motor/generator 80 converts rotational energy into electrical power which is stored in the battery 86.

An optional damper 90 such as a torsional spring is operatively connected between the input member 17 and the main shaft 16. The damper 90 acts to absorb engine vibration, so that it is not relayed to the main shaft 16 and smooth operation of the transmission 10 is not compromised.

As is apparent from the drawing, the input member 17 as well as the coaxial main shaft and output member 19 share a common axis of rotation 92 about which the planetary gear sets 20, 30, 40, 60 as well as the rotor 84 of the motor/generator 80 rotate. Rotating portions of the torque-transmitting mechanisms also rotate about the common axis of rotation 92. Torque is transferred from the output member 19 via a first transfer gear 94 which rotates about the common axis of rotation 92 and a bearing 96 which is grounded to the transmission housing 76. The first transfer gear 94 intermeshes with a second transfer gear 98 which rotates about a second axis of rotation 100. A third transfer gear 102 intermeshes with a fourth transfer gear 104 to provide torque to final drive members 106, 108 which provide rotation to the vehicle wheels via differential mechanism 110 at a third axis of rotation 111.

The torque-transmitting mechanisms 50, 52, 54, 56, 58 and 59 are selectively engagable to provide six forward modes and a reverse mode. As used herein, a "mode" is a particular operating state, whether encompassing a continuous range of speed ratios or only a fixed speed ratio, achieved by engagement of a particular torque-transmitting mechanism or torque-transmitting mechanisms. A reverse speed ratio is established with the engagement of the torque-transmitting mechanisms 54 and 59. If the ring gear/sun gear tooth ratio of the planetary gear set 20 is 2.24, the ring gear/sun gear tooth ratio of the planetary gear set 30 is 2.17, and the ring gear/sun gear tooth ratio of the planetary gear set 40 is 2.94, the reverse gear ratio will be −2.94. A first forward mode is established with the engagement of the torque-transmitting mechanisms 50, 58 and 59. If the motor/generator 80 is controlled so as not to influence the speed of the output member 19, a first fixed speed ratio of 4.584 is achieved. A second forward mode is established with the engagement of the torque-transmitting mechanisms 52 and 58. If the motor/generator 80 is controlled so as not to influence the speed of the output member 19, a fixed speed ratio of 2.964 is achieved. A third forward mode is established with the engagement of the of the torque-transmitting mechanisms 54 and 58. If the motor/generator 80 is controlled so as not to influence the speed of the output member 19, a fixed speed ratio of 1.912 is achieved. A fourth forward mode is established with the engagement of the torque-transmitting mechanisms 56 and 58. If the motor/generator 80 is controlled so as not to influence the speed of the output member 19, a fixed speed ratio of 1.446 is achieved. A fifth forward mode is established with the engagement of the torque-transmitting mechanisms 54 and 56 and establishes a direct drive ratio of 1.0. A sixth forward mode is established with the engagement of the clutches 52 and 56. If the motor/generator 80 is controlled so as not to influence the speed of the output member 19, the sixth forward mode will be a fixed ratio with a speed ratio of 0.746. The overall transmission ratio utilizing the above referenced sample of the ring gear/sun gear tooth ratios is 6.14.

The coaxial arrangement of the electromechanical transmission 10 permits the motor/generator 80, the planetary gear set 60 and the damper 90 to be packaged within a packaging space 112 having an axial width 114. The packaging space 112 also represents a torque converter which typically is packaged in the axial width 114 in a multi-speed non-hybrid transmission. In fact, a non-hybrid multi-speed transmission may be converted or redesigned to achieve the electromechanical transmission 10 by removing a torque converter from the packaging space 112 and installing the motor/generator 80, the planetary gear set 60 and the damper 90. Thus, by packaging the hybrid elements (the motor/generator 80 and the additional planetary gear set 60) within the packaging space 112, efficient use of existing use of transmission design may be utilized and an electromechanical transmission 10 may be achieved with minimal redesigning steps. Also, because the output member 19 is concentric with the input member 17 and the main shaft 16, the motor/generator may be continuously connected at the output end of the transmission 10 (i.e., connected with output member 19, downstream in power flow from the selectively engagable torque-transmitting mechanisms). This allows the motor/generator 80 to be utilized for regenerative braking without impact from transmission shifting. Specifically, the motor/generator may absorb energy from the output member 19 during braking and store the energy in the battery 86. The motor/generator may operate in this manner in every transmission mode (i.e., in every combination of engaged torque-transmitting mechanisms that establish a transmission ratio or range of ratios) because the connection between the output member 19 and the motor/generator is free of selective engagements (i.e., none of the torque-transmitting mechanisms are connected between the output member 19 and the connection to the motor/generator 80).

The electromechanical transmission 10 utilizes an engine starter motor/generator 116 for starting the engine after a hybrid stop. To start the engine, the starter motor/generator 116 (also referred to as a belt alternator starter (BAS) motor, the operation of which is well understood by those skilled in the art), is selectively connected with the input member 17 via engagement of a clutch 118 which transfers torque from the starter motor/generator 116 to the input member 17 via a rotational transfer element 120 such as a chain or belt which links the starter shaft 122 to the input member 17 via first and second rotating elements 124 and 126. The rotating elements 124 and 126 are pulleys or sprockets and are continuously connected and rotate about the starter shaft 122 and input member 17, respectively. Preferably, the clutch 118 is an electromagnetic clutch. Torque-transmitting mechanisms 50, 58 and 59 are engaged to establish the first fixed speed ratio, with the torque-transmitting mechanism 59 being slipped while engine speed increases during launch.

When the clutch 118 is engaged, torque from the input member 17 may also be provided to the starter shaft 122 and from there, via additional rotational transfer elements such as chains 128 and 130 from pulley or rotating element 132 to pulleys 134 and 136. From there, other vehicle components, including power steering system 140 and air conditioning system 142 are powered. When the clutch 118 is disconnected from the input member 17, engine power is not available to power the other vehicle components. In this state, the starter motor/generator 116 may be utilized as a generator to power the components 140, 142 via the rotational transfer elements 128, 130 and pulleys 132, 134 and 136. The starter motor/generator 116, the clutch 118 and the various rotational transfer elements 120, 128, and 130, as well as the pulleys 126, 132, 134 and 136 comprise the belt alternator starter system.

Accordingly, a method of redesigning a transmission, described with respect to the transmission 10 of the drawing, includes providing a transmission 10 having a torque converter (represented by packaging space 112) packaged between the input member 17 and the plurality of gear members 18. The transmission 10 also has an output member 19 that is positioned axially between the plurality of gear members 18 and the torque converter (i.e., the packaging space 112). The torque converter defines an axial width 114. The method includes replacing the torque converter with a motor/generator 80 that is continuously connected to output member 19 and is positioned in the axial width 114. The method may further include adding a differential gear set, such as planetary gear set 60 having first, second and third members such as the sun gear member 62, ring gear member 64 and the carrier member 69. One of the members (the sun gear member 52) is continuously connected with the motor/generator 80 and another of the members (the carrier member 69) is continuously connected with the output member 19. The planetary gear set 60 is coaxial with the motor/generator 80 and is packaged in the axial width 114. The method may include adding a damping element 90 which is connected to the input member 17 and the plurality of gear members 18 and is also packaged in the axial width 114. By this method, an existing non-hybrid transmission may be redesigned and converted to an electromechanical transmission by simply removing the torque converter and, instead, packaging a motor/generator 80 within the packaging space 112 previously occupied by the torque converter.

While the best mode for carrying out the invention has been described in detail, those familiar with the art to which this invention relates will recognize various alternative designs and embodiments for practicing the invention within the scope of the appended claims.

The invention claimed is:

1. An electro-mechanical transmission comprising:
   an input member for receiving power from an engine;
   an output member;
   a plurality of gear members operable for changing speed ratio between said input member and said output member; said input member being connected with one of said gear members and said output member being connected with another of said gear members; and
   a motor/generator operatively connected with said output member in parallel with said another of said gear members;
   said motor/generator being packaged axially between said input member and said plurality of gear members.

2. The electro-mechanical transmission of claim 1, wherein said plurality of gear members and said motor/generator rotate about a common axis of rotation defined by said input member and said output member.

3. The electro-mechanical transmission of claim 2, further comprising:
   a main shaft, said gear member connected with said input member being connected via said main shaft; and
   wherein said output member is a transfer shaft coaxial with said main shaft.

4. The electro-mechanical transmission of claim 3, further comprising:
   a planetary gear set having a first, a second and a third member; said motor/generator being connected with one of said members of said planetary gear set and said transfer shaft being connected with another of said members of said planetary gear set.

5. The electro-mechanical transmission of claim 4, wherein said members of said planetary gear set include a ring gear member, a sun gear member and a carrier member; and
   wherein said motor/generator is connected with said sun gear member, said carrier member is connected with said transfer shaft and said ring gear member is connected with a stationary member.

6. The electro-mechanical transmission of claim 1, further comprising:
   a damper connected between said input member and said plurality of gear members.

7. The electro-mechanical transmission of claim 1, further comprising:
   a starter motor/generator;
   a rotational transfer element;
   a clutch selectively engageable to connect said starter motor/generator with said input member via said rotational transfer element to allow said staffer motor/generator to provide torque to said input member for starting the engine or receive torque from said input member for powering other vehicle components.

8. The electro-mechanical transmission of claim 1, wherein said plurality of gear members includes a first, a second and a third planetary gear set and further comprising:
   a plurality of torque-transmitting mechanisms, each torque-transmitting mechanism being selectively engageable for selectively connecting a respective one of said gear members with another respective one of said gear members, with said input member or with a stationary member.

9. The electro-mechanical transmission of claim 8, wherein said torque-transmitting mechanisms are selectively engagable to establish multiple forward modes; and wherein said motor/generator is continuously connected with said output member such that torque transfer to said motor/generator from said output member may occur in each of said forward modes.

10. The electro-mechanical transmission of claim 1, wherein said transmission is characterized by an absence of a torque converter.

11. An electro-mechanical transmission comprising:
   an input member for receiving power from an engine;
   an output member;
   a main shaft; said output member being concentric with said main shaft;
   a plurality of gear members operatively connected between said main shaft and said output member for changing speed ratio therebetween;
   a motor/generator; and
   a differential gear set having a first, a second and a third member, said motor/generator being connected with one of said members of said differential gear set and said output member being connected with another of said members of said differential gear set, said motor/generator and differential gear set being concentric and coaxially aligned for rotation about said main shaft such that said motor/generator circumscribes said differential gear set.

12. The electro-mechanical transmission of claim 11, further comprising:
   a damper connected between said input member and said main shaft for absorbing engine vibration.

13. The electro-mechanical transmission of claim 11, wherein said motor/generator and said output member are continuously connected with said respective members of said differential gear set.

14. The electro-mechanical transmission of claim 11, further comprising:
   a starter motor/generator;
   a rotational transfer element; and
   a clutch selectively engagable to connect said starter motor/generator with said input member via said rotational transfer device to allow said starter motor/generator to provide torque to said input member for starting the engine or receive torque from said input member for powering other vehicle components.

15. A method of redesigning a transmission comprising:
providing a transmission having:
   a torque converter;
   an input member and an output member;
   a plurality of gear members for transferring torque from said input member to said output member;
   said torque converter being packaged between said input member and said plurality of gear members, and said output member being positioned axially between said plurality of gear members and said torque converter;
   said torque converter defining an axial width; and
replacing said torque converter with a motor/generator continuously connected to said output member and positioned in said axial width.

16. The method of claim 15, further comprising:
adding a differential gear set having first, second and third members with one of said members continuously connected with said motor/generator and another of said members continuously connected with said output member, said differential gear set being coaxial with said motor/generator and packaged in said axial width.

17. The method of claim 15, further comprising:
adding a damping element connected between said input member and said plurality of gear members and packaged in said axial width.

* * * * *